United States Patent
Greve et al.

(10) Patent No.: US 8,617,671 B2
(45) Date of Patent: *Dec. 31, 2013

(54) EMBLEM ASSEMBLY AND METHOD OF FORMING SAME

(75) Inventors: Bruce N. Greve, Clarkston, MI (US); Kitty L. Gong, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/892,030

(22) Filed: Sep. 28, 2010

(65) Prior Publication Data

US 2012/0076960 A1 Mar. 29, 2012

(51) Int. Cl.
*A47G 1/12* (2006.01)
*B29C 39/10* (2006.01)

(52) U.S. Cl.
USPC ............... 428/13; 428/67; 428/187; 428/221; 428/542.2; 264/1.7; 264/132; 264/135; 264/246; 264/247; 264/251; 264/263; 264/268; 264/274

(58) Field of Classification Search
USPC ............ 428/13, 67, 187, 542.2, 221; 264/1.7, 264/132, 135, 246, 247, 251, 263, 268, 274
See application file for complete search history.

(56) References Cited

U.S. PATENT DOCUMENTS

| | | | |
|---|---|---|---|
| 4,076,789 A | | 2/1978 | Geller et al. |
| 4,130,623 A | | 12/1978 | Walter |
| 4,292,827 A | * | 10/1981 | Waugh .............................. 72/46 |
| 4,481,160 A | * | 11/1984 | Bree .............................. 264/135 |
| 4,556,588 A | * | 12/1985 | Rockwood ...................... 428/13 |
| 4,769,100 A | | 9/1988 | Short et al. |
| 4,824,506 A | | 4/1989 | Hoerner et al. |
| 4,826,713 A | * | 5/1989 | Cook .............................. 428/31 |
| 4,828,637 A | | 5/1989 | Mentzer et al. |

(Continued)

FOREIGN PATENT DOCUMENTS

| | | |
|---|---|---|
| DE | 9321214 U1 | 9/1996 |
| DE | 102007041347 A1 | 3/2009 |

(Continued)

OTHER PUBLICATIONS

U.S. Appl. No. 13/343,763, filed Jan. 5, 2012; Catherine A. Ostrander, Kitty L. Gong, Charles K. Buehler, Chris A. Oberlitner.

(Continued)

*Primary Examiner* — Cathy Lam
(74) *Attorney, Agent, or Firm* — Quinn Law Group, PLLC

(57) ABSTRACT

An emblem assembly configured for attachment to a vehicle includes a first element and a second element. The first element is configured for attachment to the vehicle and has a first surface and a second surface recessed from the first surface. The second element is configured for attachment to the first element and has a third surface, a fourth surface spaced apart from the third surface, and a fifth surface extending between the third and fourth surfaces, wherein the fifth surface is spaced apart from the second surface to define a channel therebetween. The assembly includes a first coating disposed on the third surface and a tape disposed in contact with at least a portion of each of the second surface, the first coating, and the fifth surface to thereby fill at least a portion of the channel. A method of forming the assembly is also disclosed.

20 Claims, 3 Drawing Sheets

(56) References Cited

U.S. PATENT DOCUMENTS

| | | | |
|---|---|---|---|
| 4,838,973 A | 6/1989 | Mentzer et al. | |
| 4,856,857 A * | 8/1989 | Takeuchi et al. | 359/3 |
| 4,868,030 A | 9/1989 | Mentzer et al. | |
| 4,957,802 A | 9/1990 | Mentzer et al. | |
| 4,960,558 A | 10/1990 | Short | |
| 4,976,896 A | 12/1990 | Short et al. | |
| 5,021,278 A | 6/1991 | Short | |
| 5,433,980 A * | 7/1995 | Auld et al. | 428/13 |
| 5,480,688 A * | 1/1996 | Kaumeyer | 428/13 |
| 5,698,276 A * | 12/1997 | Mirabitur | 428/31 |
| 5,795,527 A * | 8/1998 | Nakamura et al. | 264/267 |
| 5,933,867 A * | 8/1999 | Corder | 2/160 |
| 6,071,621 A * | 6/2000 | Falaas et al. | 428/425.8 |
| 6,372,341 B1 * | 4/2002 | Jung et al. | 428/354 |
| 6,579,397 B1 | 6/2003 | Spain et al. | |
| 6,641,921 B2 * | 11/2003 | Falaas et al. | 428/425.8 |
| 6,646,022 B2 * | 11/2003 | Okazaki et al. | 522/153 |
| 6,682,805 B1 | 1/2004 | Lilly | |
| 6,818,305 B2 * | 11/2004 | Murar et al. | 428/412 |
| 6,835,348 B2 | 12/2004 | Hirosue et al. | |
| 6,863,854 B2 | 3/2005 | Lilly | |
| 7,390,454 B2 | 6/2008 | Ostrander et al. | |
| 7,645,416 B2 | 1/2010 | Buehler et al. | |
| 2002/0032250 A1 | 3/2002 | Okazaki et al. | |
| 2003/0008134 A1 | 1/2003 | Murar et al. | |

FOREIGN PATENT DOCUMENTS

| | | |
|---|---|---|
| EP | 0060721 A1 | 9/1982 |
| EP | 0942820 A1 | 9/1999 |
| WO | 9908870 A1 | 2/1999 |

OTHER PUBLICATIONS

U.S. Appl. No. 13/303,729, filed Nov. 23, 2011; Catherine A. Ostrander, Kitty L. Gong, Charles K. Buehler, Chris A. Oberlitner.

U.S. Appl. No. 13/361,173, filed Jan. 30, 2012; Catherine A. Ostrander, Joel Colombo, Mary K. Gusie, Kitty L. Gong, Charles K. Buehler, Michael P. Balogh.

* cited by examiner

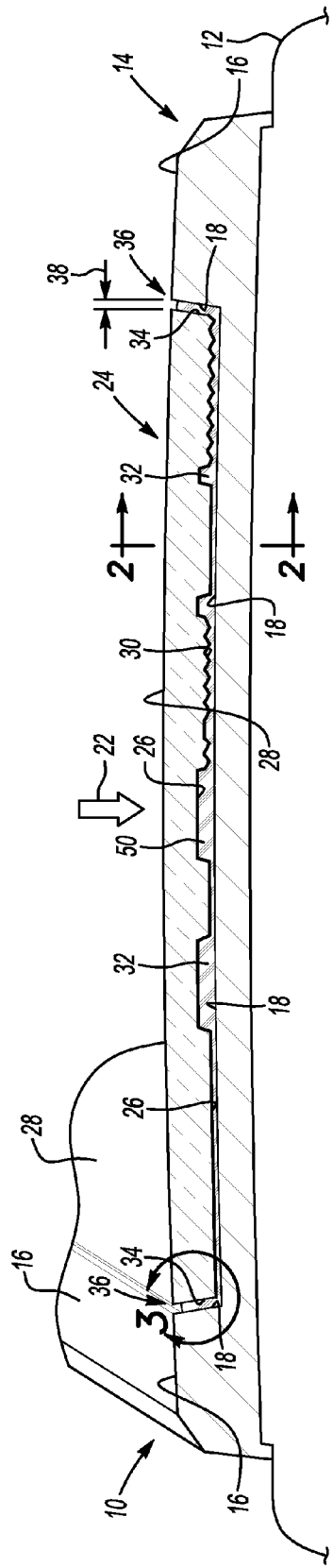
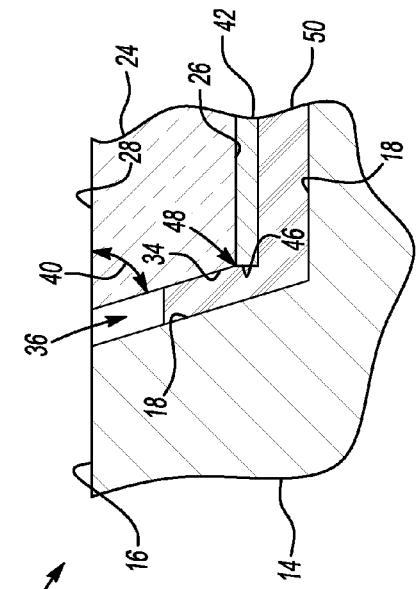
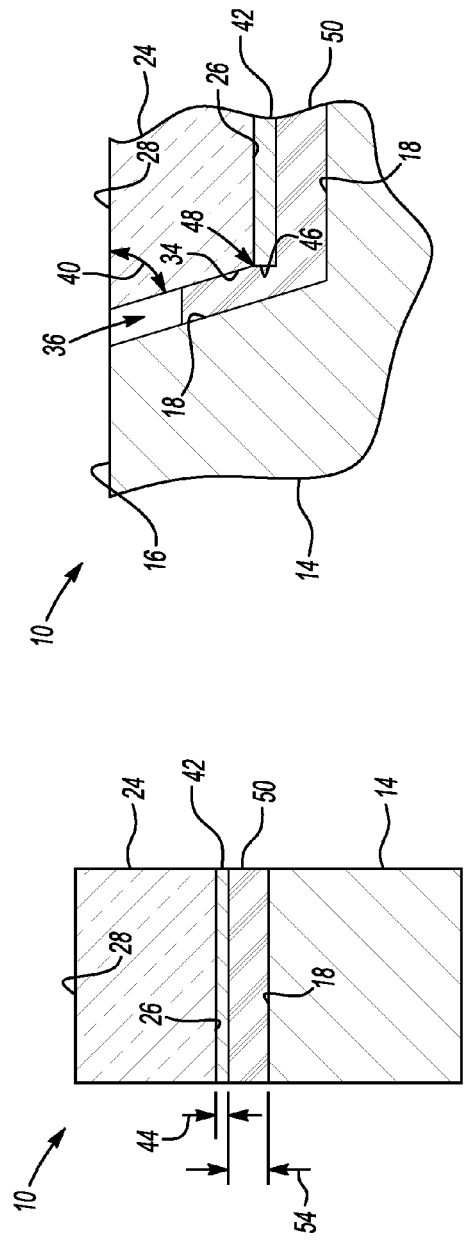

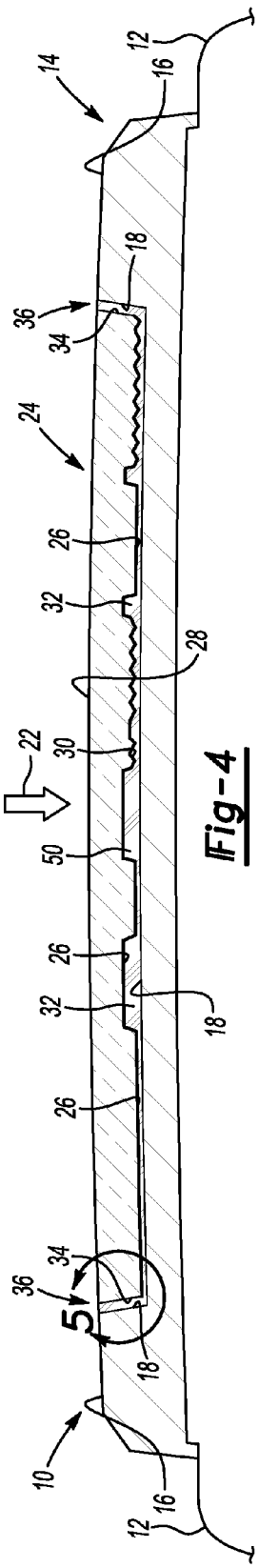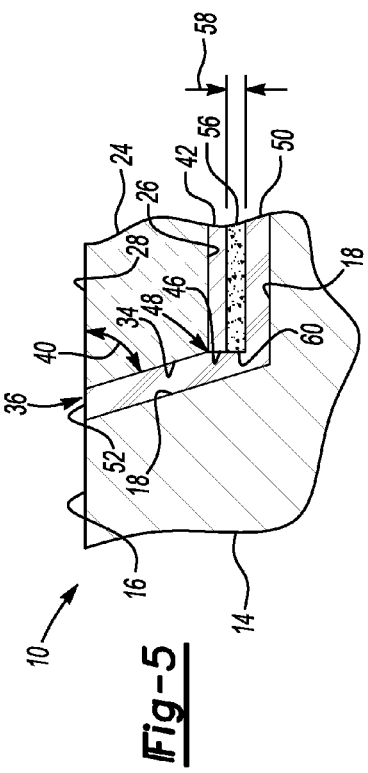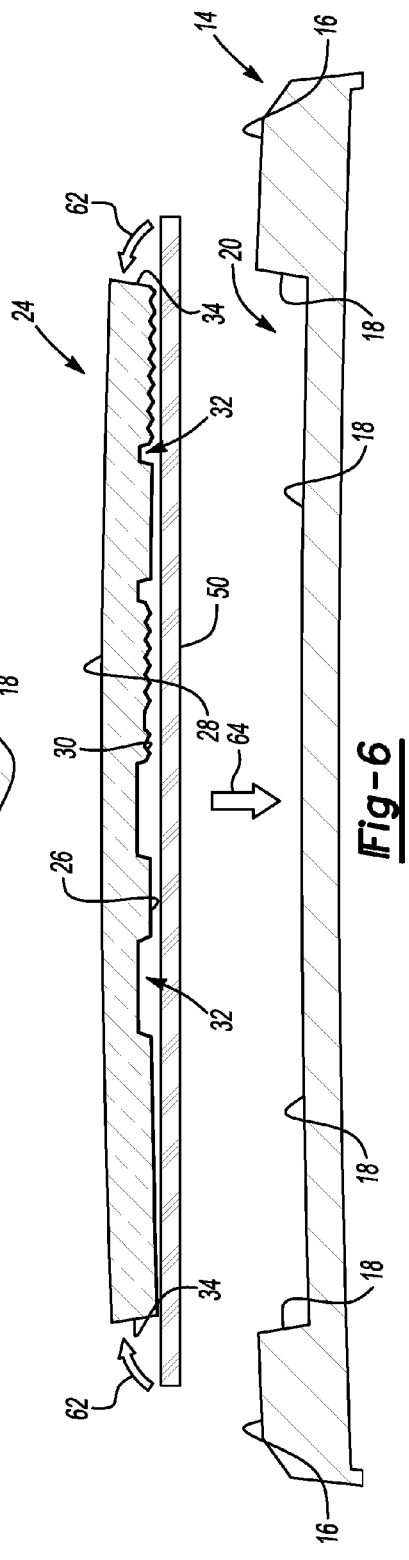

EMBLEM ASSEMBLY AND METHOD OF FORMING SAME

TECHNICAL FIELD

The present disclosure generally relates to emblem assemblies configured for attachment to a vehicle.

BACKGROUND

Vehicles often include distinctive badging, such as emblems, to denote a brand and/or manufacturer of the vehicle. Such emblems are generally designed to convey a positive and easily-recognizable association between the vehicle and the manufacturer of the vehicle, and are therefore often attached to visible exterior and interior surfaces of the vehicle, e.g., front grilles, rear liftgates and trunks, wheel covers, and/or steering wheels. Any defect or degradation of the emblem may diminish the perceived quality of the vehicle and/or tarnish the reputation of the vehicle manufacturer.

SUMMARY

An emblem assembly configured for attachment to a vehicle includes a first element and a second element. The first element is configured for attachment to the vehicle and has a first surface and a second surface recessed from the first surface. The second element is configured for attachment to the first element and has a third surface, a fourth surface spaced apart from the third surface, and a fifth surface extending between the third surface and the fourth surface, wherein the fifth surface is spaced apart from the second surface to define a channel therebetween. The emblem assembly further includes a first coating disposed on the third surface, and a tape disposed in contact with at least a portion of each of the second surface, the first coating, and the fifth surface to thereby fill at least a portion of the channel and adhere the second element to the first element.

In one variation, the first coating includes vacuum metalized aluminum and is substantially free from degradation, and the tape includes acrylic and foam. The emblem assembly also includes a transparent second element and a second coating disposed on the first coating. In addition, the fifth surface abuts the third surface to form a corner, and the tape is disposed in contact with at least a portion of each of the second surface, the first coating, and the fifth surface to thereby wrap around the corner, fill at least a portion of the channel, and adhere the second element to the first element.

A method of forming the emblem assembly includes positioning the tape onto the second element, and, after positioning, wrapping at least a portion of the fifth surface and the first coating with the tape. After wrapping, the method further includes inserting the second element into the first element whereby the tape contacts each of the fifth surface, the first coating, and the second surface to adhere the second element to the first element and thereby form the emblem assembly.

The emblem assembly, and more specifically, the first coating of the emblem assembly, exhibits minimized degradation over an operating life of a vehicle. For example, the first coating is substantially free from corrosion after prolonged exposure to cleaning solutions and vehicle operating environments. In particular, the tape sufficiently seals the channel of the emblem assembly to prevent ingress of fluids and/or contaminants to thereby minimize contact between such fluids and/or contaminants and the first coating. Further, the method allows for economical and efficient formation of the emblem assembly, and the emblem assembly contributes to an increased perceived quality of the vehicle.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic cross-sectional view of an emblem assembly having a planar configuration and including a first element and a second element;

FIG. 2 is a schematic cross-sectional view of the emblem assembly of FIG. 1 along section line 2-2;

FIG. 3 is a schematic cross-sectional view of a portion of the emblem assembly of FIG. 1;

FIG. 4 is a schematic cross-sectional view of a portion of another embodiment of the emblem assembly of FIG. 1;

FIG. 5 is a schematic cross-sectional view of a portion of yet another embodiment of the emblem assembly of FIG. 4;

FIG. 6 is a schematic illustration of a method of forming the emblem assemblies of FIGS. 1, 4, and 5.

DETAILED DESCRIPTION

Figure 7:
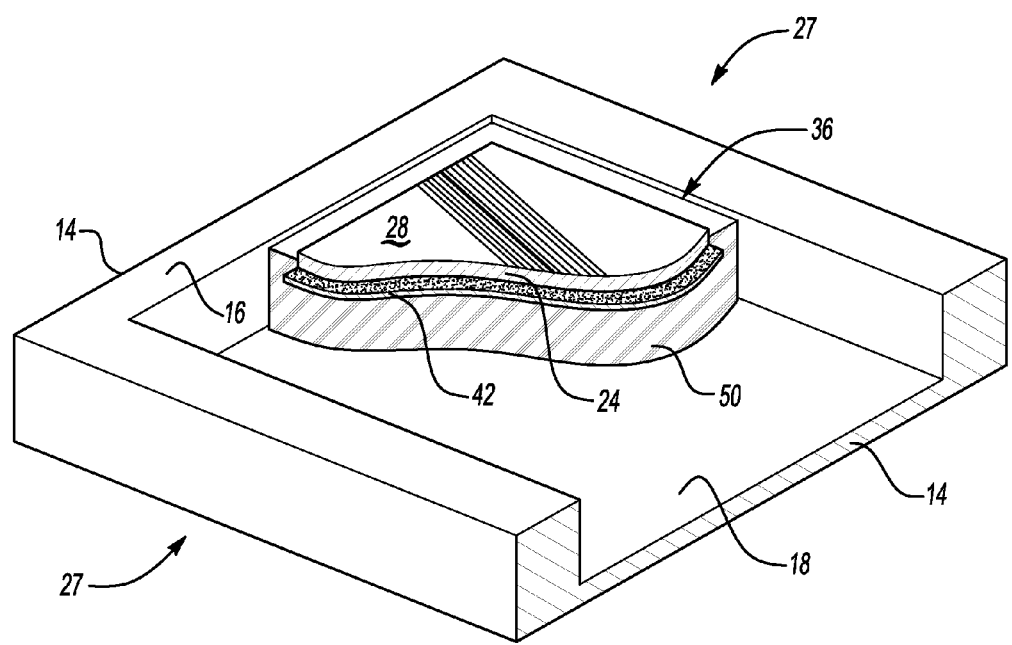
FIG. 7 is a schematic fragmentary perspective planar view of a corner configuration of the emblem assembly of FIG. 1.

Referring to the Figures, wherein like reference numerals refer to like elements, an emblem assembly is shown generally at 10 in FIG. 1. The emblem assembly 10 is configured for attachment to a vehicle 12, such as an automotive vehicle. However, the emblem assembly 10 may also be useful for non-automotive vehicles such as, but not limited to, construction, rail, aviation, and marine vehicles.

Referring again to FIG. 1, the emblem assembly 10 includes a first element 14 configured for attachment to the vehicle 12. For example, the first element 14 may be a carrier or bezel and may be configured for attachment to any location or component (not shown) of the vehicle 12, such as, but not limited to, a front grille, rear liftgate, trunk lid, wheel cover, side panel, trim panel, and/or steering wheel. The first element 14 may be attached to the vehicle 12 via any suitable method or attachment device, e.g., screws, tape, or a snap-fit. Therefore, the first element 14 may be formed from any suitable material and selected according to an expected operating environment of the vehicle 12. By way of non-limiting examples, the first element 14 may be formed from metal, plastic, and combinations thereof. In addition, the first element 14 may be coated for aesthetics and/or protection. For example, the first element 14 may be formed from chrome-plated plastic, such as acrylonitrile butadiene styrene (ABS).

With continued reference to FIG. 1, the first element 14 has a first surface 16 and a second surface 18 recessed from the first surface 16. That is, the second surface 18 may extend from the first surface 16 and define a recession or cavity 20 (FIG. 6) within the first element 14. In one example shown in FIG. 1, the second surface 18 may be substantially U-shaped. During vehicle operation, a portion of the first surface 16 may be visible to a potential occupant or operator of the vehicle 12 when viewed from a direction of arrow 22 (FIG. 1). In contrast, the second surface 18 may be substantially hidden by another component of the emblem assembly 10, as set forth in more detail below.

The emblem assembly 10 also includes a second element 24, as shown in FIG. 1. The second element 24 is configured for attachment to the first element 14 and may be generally sized and shaped to fit within the cavity 20 (FIG. 6) defined by the second surface 18 of the first element 14. For example, the second element 24 may be a lens configured for attachment to the aforementioned bezel, i.e., the first element 14. Further, comparatively more of the second element 24 may be visible to a potential occupant or operator of the vehicle 12 than the first element 14 when viewed from the direction of arrow 22. Therefore, the second element 24 may have a shape easily-recognizable as associated with a specific vehicle brand and/or manufacturer. For example, the second element 24 may have a square shape, a bowtie shape, a pointed shape, and/or may include a circular crest shape or a combination of letters. In addition, the second element 24 may have a shape that is the same or different than the shape of the first element 14.

Referring again to FIG. 1, the second element 24 has a third surface 26 and a fourth surface 28 spaced apart from the third surface 26. The third surface 26 may define a plurality of grooves 30 and/or voids 32 configured for reducing a weight of the second element 24 and/or enhancing attachment between the first element 14 and the second element 24. In general, the third surface 26 may be hidden from view upon attachment of the emblem assembly 10 to the vehicle 12 when viewed from a direction of arrow 22. In contrast, the fourth surface 28 may be visible to a potential occupant or operator of the vehicle 12 upon attachment of the emblem assembly 10 to the vehicle 12 when viewed from the direction of arrow 22.

Referring again to FIG. 1, the second element 24 also has a fifth surface 34 extending between the third surface 26 and the fourth surface 28, wherein the fifth surface 34 is spaced apart from the second surface 18 to define a channel 36 therebetween. That is, when the second element 24 is attached to the first element 14, as set forth in more detail below, the second surface 18 is disposed adjacent the fifth surface 34, and the channel 36 is defined therebetween. The channel 36 may have a width 38 of from about 0.3 mm to about 0.7 mm, e.g., about 0.5 mm, so as to define a minimal gap between the first element 14 and the second element 24. As such, the fifth surface 34 may also be substantially hidden from a vehicle occupant or operator when the first element 14 is attached to the second element 24.

As shown in FIG. 3, the fifth surface 34 and at least one of the third surface 26 and the fourth surface 28 may define an angle 40 therebetween of less than or equal to 90°. That is, a portion of the second element 24 may be tapered. Alternatively, although not shown, the third surface 26 and the fourth surface 28 may each be substantially perpendicular to the fifth surface 34.

The second element 24 may be formed from any suitable material. For example, the second element 24 may be formed from plastic, such as acrylic, metal, such as aluminum, and combinations thereof. In addition, the second element 24 may be translucent, and/or may be tinted to a specific color, e.g., gold or red. In one variation, the second element 24 is transparent.

Referring now to FIG. 2, the emblem assembly 10 of FIG. 1 also includes a first coating 42 disposed on the third surface 26. It is to be appreciated that for purposes of illustration the first coating 42 is not visible in FIG. 1. However, the first coating 42 is disposed on the third surface 26 of FIG. 1, as best shown in FIGS. 2 and 3. The first coating 42 may be a layer capable of imparting enhanced aesthetics to the second element 24 and the emblem assembly 10. For example, the first coating 42 may include aluminum to impart a sheen or metallic appearance to the second element 24.

The first coating 42 may be deposited on the third surface 26 via any suitable process. More specifically, in one embodiment, the first coating 42 may include vacuum metalized aluminum. That is, the first coating 42 may be deposited onto the third surface 26 of the second element 24 via vacuum metallization. As used herein, the terminology "vacuum metallization" refers to a physical vapor deposition process capable of depositing a thin aluminum layer, i.e., the first coating 42, onto a plastic component, e.g., the second element 24. The first coating 42 may have a thickness 44 (FIG. 2) of from about 0.01 μm to about 0.2 μm. Further, the thickness 44 of the first coating 42 may not substantially vary along the third surface 26, and the first coating 42 may be disposed along the entire third surface 26, e.g., along any grooves 30 (FIG. 1) and/or voids 32 (FIG. 1) defined by the third surface 26.

Additionally, for the variation including the transparent second element 24, the first coating 42 may be visible through the fourth surface 28 when viewed from the direction of arrow 22 (FIG. 1). Therefore, to maximize the perceived quality of the vehicle 12, the first coating 42 may be substantially free from degradation, such as, but not limited to, corrosion, delamination, chipping, tears, uneven thickness 44, uneven sheen or gloss, and combinations thereof.

As best shown in FIG. 3, the first coating 42 may not extend along the fifth surface 34. That is, the first coating 42 may have a boundary 46 that terminates at an intersection of the third surface 26 and the fifth surface 34. In one variation, as shown in FIG. 3, the fifth surface 34 abuts the third surface 26 to form a corner 48. Therefore, the first coating 42 may be disposed solely along the third surface 26 so as not to wrap around the corner 48 of the second element 24.

Referring again to FIGS. 1-3, the emblem assembly 10 further includes a tape 50 disposed in contact with at least a portion of each of the second surface 18, the first coating 42, and the fifth surface 34 to thereby fill at least a portion of the channel 36 and adhere the second element 24 to the first element 14. More specifically, the tape 50 may abut the second surface 18 and wrap around the corner 48 (FIG. 3) of the second element 24 to thereby act as an insulator from or barrier to environmental contaminants and/or fluids. Therefore, as best shown in FIG. 3, the tape 50 also contacts the first coating 42, e.g., at the boundary 46 of the first coating 42, and fills at least a portion of the channel 36. Stated differently, the tape 50 may extend from the second surface 18 into the channel 36 and seal at least a portion of the channel 36 and the first coating 42 from the environment exterior to the vehicle 12. In this variation, therefore, the tape 50 may not be visible when viewed from a direction of arrow 22 in FIG. 1.

Alternatively, as shown in FIGS. 4 and 5, the tape 50 may substantially fill the channel 36. That is, the tape 50 may have an edge 52 (FIG. 5) that is substantially flush with the fourth surface 28. Therefore, in this variation, the tape 50 may be visible when viewed from a direction of arrow 22 in FIG. 1.

As shown in FIGS. 3 and 6 and set forth above, the tape 50 is disposed in contact with at least a portion of each of the second surface 18, the first coating 42, and the fifth surface 34. That is, the tape 50 may be positioned, and repositioned if necessary, to contact at least a portion of, for example, the first coating 42. In one example, the tape 50 may be positioned onto the second element 24 as shown in FIG. 6, and then wrapped around the corner 48 (FIG. 3) to thereby contact each of the first coating 42 and the fifth surface 34. That is, with reference to FIG. 3, the tape 50 is disposed in contact with at least a portion of each of the second surface 18, the first coating 42, and the fifth surface 34 to thereby wrap around the corner 48, fill at least a portion of the channel 36, and adhere the second element 24 to the first element 14. Further, if the tape 50 is misaligned and/or misregistered with respect to the second element 24, the tape 50 may be repositioned to a desired alignment and/or registration.

As set forth above, the tape 50 adheres the second element 24 to the first element 14. More specifically, as best shown in FIG. 2, the tape 50 may adhere the second surface 18 to the first coating 42 so that the second element 24 is attached to the first element 14. The tape 50 may be impermeable to environmental contaminants, e.g., dirt, rain, snow, and cleaning agents encountered during operation of the vehicle 12. The tape 50 may have a thickness 54 (FIG. 2) of from about 0.2 mm to about 0.8 mm. For example, the tape 50 may have a thickness 54 of about 0.5 mm so as to contact each of the second surface 18 and the fifth surface 34 (FIG. 3) within the channel 36 (FIG. 3). More specifically, the tape 50 may sufficiently contact, e.g., uniformly contact, both of the second surface 18 and the fifth surface 34 to seal off any potential entry routes for environmental contaminants and thereby protect the first coating 42. That is, the tape 50 may be "wet-out" to uniformly contact each of the second surface 18 and the fifth surface 34, minimize or eliminate any air pockets between the second surface 18, the tape 50, and the fifth surface 34, and thereby protect the first coating 42. Further, the tape 50 may exhibit compressability and may have an elongation at break of at least 100% when measured in accordance with test method ASTM D-3759. That is, the tape 50 may stretch and compress within the channel 36 and seal off any entry routes for environmental contaminants. Therefore, as best shown in FIG. 1, the fourth surface 28 may be substantially flush with the first surface 16. That is, the second element 24 may not protrude from the first element 14, but rather the fourth surface 28 of the second element 24 may be coplanar with the first surface 16 of the first element 14. Further, as shown in FIG. 7, the second element 24 may be disposed within a periphery 27 of the first element 14, and the tape 50 may compress within the channel 36.

In one variation, the tape 50 may include acrylic and foam. That is, the tape 50 may include a viscoelastic foam core and acrylic adhesive, and may be double-sided. That is, the acrylic adhesive may be disposed on two opposing surfaces of the viscoelastic foam core. A specific example of a suitable tape 50 is 3M™ Acrylic Foam Tape 5344, commercially available from 3M of St. Paul, Minn.

Referring now to FIG. 5, the emblem assembly 10 may further include a second coating 56 sandwiched between and disposed in contact with each of the first coating 42 and the tape 50. The second coating 56 may be a layer capable of imparting enhanced protection to the first coating 42 and the emblem assembly 10. For example, the second coating 56 may be an alkyd enamel and/or may include ultraviolet protectants, corrosion inhibitors, sacrificial constituents, and combinations thereof. That is, the second coating 56 may be selected to degrade before the first coating 42 when subjected to identical operating environments, e.g., dirt, rain, snow, and/or cleaning agents.

The second coating 56 may be deposited on the first coating 42 via any suitable process. For example, the second coating 56 may be applied via dip-coating, spraying, rolling, electrostatic painting, and combinations thereof. The second coating 56 may have a thickness 58 (FIG. 5) of from about 0.05 μm to about 0.15 μm. The thickness 58 of the second coating 56 may not substantially vary along the first coating 42 disposed on the third surface 26, and the second coating 56 may be disposed along the entire first coating 42 and follow the contour of the first coating 42 along any grooves 30 (FIG. 1) and/or voids 32 (FIG. 1) defined by the third surface 26.

Additionally, the second coating 56 may not be visible through the first coating 42 when viewed through the fourth surface 28 in the direction of arrow 22 (FIG. 1). That is, the first coating 42 may not be transparent and/or translucent, and may therefore block the second coating 56 from view when viewed from the direction of arrow 22. However, the second coating 56 may have a dark hue or color, e.g., black, to impart perceived depth or tone to the first coating 42. That is, the second coating 56 may function both as a primer and a protectant, i.e., to further protect the first coating 42 from degradation such as corrosion.

As best shown in FIG. 5, the second coating 56 may not extend along the fifth surface 34. That is, the second coating 56 may have a second boundary 60 aligned with the boundary 46 of the first coating 42. Stated differently, the second boundary 60 may also align with the intersection of the third surface 26 and the fifth surface 34. For example, the second coating 56 may be disposed solely along the first coating 42 so as not to wrap around the corner 48 of the second element 24.

With continued reference to FIG. 5, in this variation, the second coating 56 may be sandwiched between the first coating 42 and the tape 50. More specifically, the tape 50 may abut the second surface 18 and wrap around the corner 48 of the second element 24 to contact both the boundary 46 of the first coating 42 and the second boundary 60 of the second coating 56 and fill at least a portion of the channel 36. Stated differently, the tape 50 may extend from the second surface 18 into the channel 36 and seal at least a portion of the channel 36, and each of the first coating 42 and the second coating 56, from the environment exterior to the vehicle 12.

Therefore, in the variation described with reference to FIG. 5, the emblem assembly 10 includes the first element 14, the transparent second element 24, the first coating 42 disposed on the third surface 26, wherein the first coating 42 includes vacuum metalized aluminum and is substantially free from degradation, the second coating 56 disposed on the first coating 42, and the tape 50 including acrylic and foam and disposed in contact with at least a portion of each of the second surface 18, the first coating 42, and the fifth surface 34 to thereby wrap around the corner 48, fill at least a portion of the channel 36, and adhere the second element 24 to the first element 14.

The tape 50 minimizes degradation of the first coating 42 over an operating life of the vehicle 12. For example, the first coating 42 is substantially free from corrosion after continued exposure to cleaning solutions and vehicle operating environments. In particular, the tape 50 sufficiently seals the channel 36 to prevent ingress of fluids and/or contaminants to thereby minimize contact between such fluids and/or contaminants and the first coating 42.

A method of forming the emblem assembly 10 is also disclosed and described with reference to FIG. 6. The method includes positioning the tape 50 onto the second element 24. For example, positioning may include pressing the tape 50 onto the third surface 26 of the second element 24, e.g., along the entire length of the third surface 26.

With continued reference to FIGS. 3 and 6, the method further includes, after positioning, wrapping at least a portion of the fifth surface 34 and the first coating 42 (FIG. 3) with the tape 50. For example, wrapping may include rolling the tape 50 onto each of the fifth surface 34 and the first coating 42, i.e., in the direction of arrows 62 in FIG. 6. That is, the tape 50 may be rolled so as to extend around the corner 48 (FIG. 3) of the second element 24 to thereby contact each of the boundary 46 (FIG. 3) of the first coating 42 and the fifth surface 34. In addition, for the variation including the second coating 56 described with reference to FIG. 5, wrapping may include rolling the tape 50 onto each of the fifth surface 34, the first coating 42, and the second coating 56. That is, the tape 50 may be rolled so as to extend around the corner 48 (FIG. 5) of the second element 24 to thereby contact each of the boundary 46 of the first coating 42, the second boundary 60 of the second coating 56, and the fifth surface 34. As set forth above, wrapping may include disposing the tape 50 on an entire length of the fifth surface 34, as shown in FIG. 4, or may include disposing the tape 50 on only a portion of the fifth surface 34, as shown in FIG. 3.

The method may further include, after positioning, repositioning the tape 50 onto the second element 24. For example, if the tape 50 is misaligned, mispositioned, and/or misregistered on the third surface 26 of the second element 24, the tape 50 may be repositioned. Likewise, if the fifth surface 34, the first coating 42 (FIG. 3), and/or the second coating 56 (FIG. 5) is miswrapped with the tape 50, the tape 50 may be repositioned. Repositioning may include, for example, peeling and re-adhering the tape 50 to a desired alignment, position, or location.

Referring again to FIGS. 3 and 6, the method also includes, after wrapping, inserting the second element 24 into the first element 14, e.g., in the direction of arrow 64, whereby the tape 50 contacts each of the fifth surface 34, the first coating 42 (FIG. 3), and the second surface 18 to thereby form the emblem assembly 10. For example, the second element 24 including the tape 50 disposed on the third surface 26 may be press fit into the cavity 20 (FIG. 6) defined by the second surface 18 so that the interaction of the first element 14 and the second element 24 compresses and stretches the tape 50 therebetween. More specifically, the tape 50 may sufficiently contact, e.g., uniformly contact, both of the second surface 18 and the fifth surface 34 to seal off any potential entry routes for environmental contaminants and thereby protect the first coating 42. That is, the tape 50 may be "wet-out" to uniformly contact each of the second surface 18 and the fifth surface 34, minimize or eliminate any air pockets between the second surface 18, the tape 50, and the fifth surface 34, and thereby protect the first coating 42. For the variation including the second coating 56 described with reference to FIG. 5, the tape 50 contacts each of the fifth surface 34, the first coating 42, the second coating 56, and the second surface 18 to thereby form the emblem assembly 10. That is, the tape 50 may uniformly contact each of the second surface 18 and the fifth surface 34, minimize or eliminate any air pockets between the second surface 18, the tape 50, and the fifth surface 34, and thereby protect each of the first coating 42 and the second coating 56.

Therefore, referring to FIGS. 3 and 6, inserting may include filling at least a portion of the channel 36 with the tape 50. That is, upon inserting the second element 24 into the first element 14, the tape 50 may contact the second surface 18 and extend from the second surface 18 into the channel 36 to thereby attach, e.g., adhere or bond, the second element 24 to the first element 14. Consequently, inserting may include sealing the channel 36, and therefore each of the first coating 42 (FIG. 3) and the fifth surface 34 from environmental contaminants to prevent ingress of contaminants and/or fluids into the channel 36. Therefore, inserting the second element 24 into the first element 14 minimizes fluid and/or contaminant contact with each of the first coating 42 and the fifth surface 34. Likewise, for the variation including the second coating 56 (FIG. 5), inserting may seal each of the first coating 42, the second coating 56, and the fifth surface 34 from exposure to such contaminants and/or fluids. As such, the method allows for economical and efficient formation of the emblem assembly 10, and the emblem assembly 10 contributes to an increased perceived quality of the vehicle 12.

While the best modes for carrying out the disclosure have been described in detail, those familiar with the art to which this disclosure relates will recognize various alternative designs and embodiments for practicing the disclosure within the scope of the appended claims.

The invention claimed is:

1. An emblem assembly configured for attachment to a vehicle, the emblem assembly comprising:
   a first element configured for attachment to the vehicle and having a first surface and a second surface recessed from said first surface, wherein said second surface is substantially U-shaped;
   a second element configured for attachment to said first element and having;
   a third surface;
   a fourth surface spaced apart from said first surface, said second surface, and said third surface; and
   a fifth surface extending between said third surface and said fourth surface, wherein said fifth surface is spaced apart from said second surface to define a channel therebetween;
   a first coating disposed on said third surface; and
   a tape disposed in contact with at least a portion of each of said second surface, said first coating, and said fifth surface to thereby fill at least a portion of said channel and adhere said second element to said first element, wherein said tape is repositionable on said second element so that said tape contacts said first coating.

2. The emblem assembly of claim 1, wherein said first coating is substantially free from corrosion.

3. The emblem assembly of claim 1, wherein said tape adheres said second surface to said first coating.

4. The emblem assembly of claim 3, wherein said fourth surface is substantially flush with said first surface.

5. The emblem assembly of claim 1, wherein said tape substantially fills said channel.

6. The emblem assembly of claim 5, wherein said tape has an edge that is substantially flush with said fourth surface.

7. The emblem assembly of claim 1, wherein said tape has an elongation at break of at least 100% when measured in accordance with test method ASTM D-3759.

8. The emblem assembly of claim 1, wherein said tape has a thickness of from about 0.2 mm to about 0.8 mm.

9. The emblem assembly of claim 1, wherein said tape includes acrylic and foam.

10. The emblem assembly of claim 1, wherein said first coating includes aluminum.

11. The emblem assembly of claim 1, further comprising a second coating sandwiched between and disposed in contact with said first coating and said tape.

12. The emblem assembly of claim 1, wherein said fifth surface and at least one of said third surface and said fourth surface defines an angle therebetween of less than or equal to 90°.

13. The emblem assembly of claim 1, wherein said second surface is substantially U-shaped.

14. An emblem assembly configured for attachment to a vehicle, the emblem assembly comprising:
   a first element configured for attachment to the vehicle and having a first surface and a second surface recessed from said first surface, wherein said second surface is substantially U-shaped;
   a transparent second element configured for attachment to said first element and having;
   a third surface;
   a fourth surface spaced apart from said first surface, said second surface, and said third surface; and
   a fifth surface extending between said third surface and said fourth surface, wherein said fifth surface abuts said third surface to form a corner and wherein said fifth surface is spaced apart from said second surface to define a channel therebetween;
a first coating disposed on said third surface, wherein said first coating includes vacuum metalized aluminum and is substantially free from corrosion;
a second coating disposed on said first coating; and
a tape including acrylic and foam and disposed in contact with at least a portion of each of said second surface, said first coating, said second coating, and said fifth surface to thereby wrap around said corner, fill at least a portion of said channel, and adhere said second element to said first element, wherein said tape is repositionable on said transparent second element so that said tape contacts said first coating and said second coating.

15. The emblem assembly of claim 14, wherein said second coating is an alkyd enamel.

16. The emblem assembly of claim 14, wherein said first coating is visible through said fourth surface.

17. A method of forming an emblem assembly configured for attachment to a vehicle, the method comprising:
positioning a tape onto a second element that is different from a first element configured for attachment to the vehicle;
wherein the first element has a first surface and a second surface that is substantially U-shaped and recessed from said first surface;
wherein the second element has;
a third surface;
a fourth surface spaced apart from the first surface, the second surface, and the third surface; and
a fifth surface extending between the third surface and the fourth surface, wherein the fifth surface is spaced apart from the second surface to define a channel therebetween;
wherein a first coating is disposed on the third surface;
after positioning, wrapping at least a portion of the fifth surface and the first coating with the tape, wherein the tape is repositionable on the second element so that the tape contacts the first coating;
after wrapping, inserting the second element into the first element so that the tape contacts each of the fifth surface, the first coating, and the second surface to adhere the second element to the first element and thereby form the emblem assembly.

18. The method of claim 17, wherein inserting includes filling at least a portion of the channel with the tape.

19. The method of claim 17, wherein wrapping includes rolling the tape onto each of the fifth surface and the first coating.

20. The method of claim 17, further comprising, after positioning, repositioning the tape onto the second element.

* * * * *